United States Patent [19]

Buehler

[11] Patent Number: 5,037,789
[45] Date of Patent: * Aug. 6, 1991

[54] NON-SUPPORTED CATALYST

[75] Inventor: Charles K. Buehler, Naperville, Ill.

[73] Assignee: Quantum Chemical Corporation, New York, N.Y.

[*] Notice: The portion of the term of this patent subsequent to Aug. 21, 2007 has been disclaimed.

[21] Appl. No.: 498,308

[22] Filed: Mar. 23, 1990

[51] Int. Cl.$^5$ .................. C08F 4/655; C08F 4/656; C08F 4/651

[52] U.S. Cl. .................. 502/119; 502/118; 502/132; 526/119

[58] Field of Search .................. 502/118, 119, 132

[56] References Cited

U.S. PATENT DOCUMENTS

| | | | |
|---|---|---|---|
| 3,135,809 | 6/1964 | Bosmajian | 260/650 |
| 3,591,656 | 6/1971 | Kroll | 260/683.9 |
| 4,156,063 | 5/1979 | Giannini et al. | 526/114 |
| 4,220,554 | 9/1980 | Scata et al. | 252/429 B |
| 4,226,741 | 10/1980 | Luciani et al. | 252/429 B |
| 4,298,718 | 11/1981 | Mayr et al. | 526/125 |
| 4,390,454 | 6/1983 | Cuffiani et al. | 252/429 B |
| 4,495,338 | 1/1985 | Mayr et al. | 502/125 |
| 4,508,843 | 4/1985 | Etherton et al. | 502/115 |
| 4,526,941 | 7/1985 | Sakurai et al. | 526/127 |
| 4,530,913 | 7/1985 | Pillukat et al. | 502/104 |
| 4,565,795 | 1/1986 | Short et al. | 502/110 |
| 4,595,735 | 6/1986 | Nomura et al. | 526/125 |
| 4,612,299 | 9/1986 | Arzoumanidis et al. | 502/104 |
| 4,647,550 | 3/1987 | Kohora et al. | 502/115 |
| 4,686,199 | 8/1987 | Tachikawa et al. | 502/104 |
| 4,738,942 | 4/1988 | Nowlin | 502/104 |
| 4,743,665 | 5/1988 | Sasaki et al. | 526/348 |
| 4,849,483 | 7/1989 | Tachikawa et al. | 526/97 |
| 4,916,099 | 4/1990 | Sasaki et al. | 502/126 |
| 4,950,630 | 8/1990 | Murata et al. | 502/116 |
| 4,950,631 | 8/1990 | Buehler et al. | 502/119 |

FOREIGN PATENT DOCUMENTS

| | | |
|---|---|---|
| 36148/89 | 12/1989 | Australia . |
| 1036388 | 10/1989 | China . |
| 0206172 | 12/1986 | European Pat. Off. . |
| 0244678 | 11/1987 | European Pat. Off. . |
| 0292134 | 11/1988 | European Pat. Off. . |
| 0347442 | 12/1989 | European Pat. Off. . |
| 162607 | 9/1983 | Japan . |
| 62-124105 | 6/1987 | Japan . |
| WO89/02446 | 3/1989 | PCT Int'l Appl. . |
| 88/7057 | 6/1989 | South Africa . |
| 8802927 | 5/1989 | Spain . |
| 2184448 | 6/1987 | United Kingdom . |

*Primary Examiner*—Patrick P. Garvin
*Attorney, Agent, or Firm*—Kenneth D. Tremain; Richard G. Jackson

[57] ABSTRACT

A new catalyst useful in the polymerization of olefins, especially propylene, is disclosed. The catalyst is produced by contacting at least one hydrocarbon soluble magnesium compound with a modifying compound selected from the group consisting of silicon halides, boron halides, aluminum halides, alkyl silicon halides and mixtures thereof. The product of this contact is contacted with a first titanium-containing compound having the structural formula $Ti(OR)_nX_m$, where R is hydrocarbyl; X is halogen; n is an integer of 1 to 4; and m is 0 or an integer of 1 to 3, with the proviso that the sum of n and m is 4, and a second titanium-containing compound having the structural formula $Tix^1_p(OR^1)_q$ where $X^1$ is halogen; $R^1$ is hydrocarbyl; p is an integer of 1 to 4; and q is 0 or an integer of 1 to 3, with the provisos that the sum of p and q is 4 and that the first and second titanium-containing compounds are not identical.

31 Claims, No Drawings

NON-SUPPORTED CATALYST

BACKGROUND OF THE DISCLOSURES

1. Field of the Invention

The instant invention is directed to a catalyst useful in the polymerization of propylene. More particularly, the instant invention is directed to an unsupported catalyst, useful in the polymerization of propylene, which is formed by steps which include treatment with magnesium and titanium compounds.

2. Background of the Prior Art

The polymerization of olefins using Ziegler-Natta catalysts is well established in the art. These catalyzed polymerizations produce polyolefins, possessing their desired characteristics, in high yield. However, the use of these conventional catalysts are subject to important failings. Thus, new and improved catalysts are continually being sought. An important class of catalyst where improvement is sought is the class of catalysts which produce the very commercially important alpha-olefin, propylene.

Commonly, catalysts having a magnesium halide support are utilized in the polymerization of propylene. However, when a propylene polymer polymerized in the presence of a magnesium halide supported catalyst is processed into a molded product, the polypropylene molding machine processing this polymer is subjected to corrosion. This corrosion is caused by the residual presence of magnesium halide in the polypropylene product. The adverse effect of this corrosion is not limited to damaging expensive molding machinery. More importantly, the polypropylene molded article processed in this equipment is characterized by aesthetic flaws.

Another detrimental property of catalysts, conventionally used in the polymerization of propylene polymers, involves the characteristic in many propylene catalysts of the prior art that they incorporate internal electron donors to insure that the propylene polymer product is highly isotactic. Those skilled in the art are aware of the criticality of stereoregularity in propylene polymers. However, those skilled in the art are also aware that the presence of internal electron donors creates difficulties. Unless the amount and type of electron donor compound is carefully selected not only is the stereoregularity of the resultant polymer deficient but poor catalytic activity often results. This detrimental effect occurs even if the amount and type of electron donor is properly chosen if the catalyst is formed with the electron donor compound added in the wrong sequence.

The utilization of electron donor compounds often creates additional problems involving offensive odors in the final polymeric product. This unfortunate result obtains even if the ideal electron donor compound, in the correct concentration, added at the proper time in the catalyst formation process, is utilized. Thus, polymers formed from catalysts which include an electron donor compound must oftentimes be deashed or deodorized in order to insure that the final product gives off no odor.

The difficulties discussed above have spurred workers skilled in this art to develop new catalysts which attempt to overcome these difficulties. In one such attempt at eliminating the problem created by halogen-containing carriers, inorganic oxides, such as silica, were proposed as a support. This carrier, containing no halogen, was reacted with a magnesium dialkoxide and an electron donor, such as a carboxylic acid monoester, and a titanium halide compound. This catalyst is described in Japanese Patent Publication 162,607/1983.

Even if the allegations made in this disclosure of high catalytic activity, production of a highly stereospecific polymer having a high bulk density and narrow particle size distribution were correct, still the problems associated with odor are not addressed by the use of this catalyst. However, testing of this catalyst establishes that the catalyst provides low activity and that the polymer product is characterized by insufficient stereoregularity and poor particle size distribution.

A more recent disclosure, U.S. Pat. No. 4,595,735, provides a catalyst component for the polymerization of olefins prepared by contacting a magnesium alkoxide, a halogenated hydrocarbon, a halogenated silane and a titanium compound. It is emphasized that this catalyst, useful in the polymerization of ethylene homopolymers and copolymers, incorporates a halogenated hydrocarbon. This catalyst is not only principally directed to the polymerization of ethylene polymers but, significantly, emphasizes the formation of high melt index polymers. Those skilled in the art are aware of the necessity for commercially useful polypropylene to possess low melt flow rates. That is, the molecular weight of the polymers produced in accordance with the '735 catalyst is significantly lower than that required of polypropylene.

U.S. Pat. No. 4,565,795 sets forth an olefin polymerization catalyst which is prepared by the reaction of a chemically treated silica support with a dihydrocarbyl magnesium compound and a halogenated tetravalent titanium compound. The chemical treatment of the silica support involves the use of a chlorinating compound, an alkanol, a silating compound, an acid chloride or an organoboron compound. Again, this catalyst includes constituents which are adverse to the production of stereoregular polymers, especially polypropylene. It is thus not surprising that this catalyst is suggested for use in the polymerization of ethylene polymers.

Very recently, a patent application assigned to the assignee of the present invention was developed which addressed the issues discussed above. That is, a new catalyst was developed which produces propylene polymers of high stereoregularity, uniform particle size distribution, good spherical morphology and high bulk density. Although this invention, embodied in U.S. patent application Ser. No. 326,708, filed Mar. 21, 1989 and now U.S. Pat. No. 4,950,631, which is a continuation of U.S. patent application, Ser. No. 99,190 filed Sept. 21, 1988, now abandoned, also represents an advance in the art in terms of propylene polymer productivity, it is desirable to produce a catalyst having even greater polymer productivity than is provided by the catalyst of this teaching.

The above remarks establish that there is a continuing need in the art for catalysts useful in the polymerization of propylene that not only produce propylene polymers having improved stereoregularity, uniform particle size distribution, good spherical morphology and high bulk density but also excellent catalytic productivity, needs not totally met by the catalysts of the prior art.

BRIEF SUMMARY OF THE INVENTION

The present invention is directed to a catalyst which, when added to propylene polymerization reactors, produce propylene homopolymers and copolymers of high stereoregularity. The propylene polymer product of polymerization reactions using the catalyst of this invention is characterized by uniform particle size distribution, good spherical morphology and high bulk density. These polypropylene characteristics enhance the productivity and processability of the polymer. In addition, the catalyst is itself highly active, resulting in higher polymer productivity, as manifested by weight of polymer per unit weight of catalyst, than the activity obtained by the catalysts of the prior art.

The catalyst of this invention is also characterized by safe and easy preparation. Unlike magnesium halide supported catalysts, expensive ball milling is not required. Neither are other expensive prepolymerization steps required of magnesium halide supported catalysts of the prior art. Because the catalyst includes no support at all, the above desirable results are obtained. Moreover, the polymer product formed in its presence has low halogen content, significantly reducing the problems of corrosion oftentimes encountered in the processing of propylene polymers. Moreover, because the catalyst retains low residual metal content, no deashing of the polymer product is required. Additionally, the polymerization reaction utilizing this catalyst is enhanced due to its relative constant activity over long periods of time. Finally, the use of the subject catalyst allows for easy control of polymer molecular weight with the judicious addition of hydrogen.

In accordance with the present invention a catalyst is provided. The catalyst comprises the product obtained by contacting at least one hydrocarbon soluble magnesium compound with a modifying compound selected from the group consisting of silicon halides, boron halides, aluminum halides, alkyl silicon halides and mixtures thereof. The product of this contact is contacted with a first titanium-containing compound having the structural formula $Ti(OR)_nX_m$, where R is hydrocarbyl; X is halogen; n is an integer of 1 to 4; and m is 0 or an integer of 1 to 3 with the proviso that the sum of n and m is 4 and a second titanium-containing compound having the structural formula $TiX^1_p(OR^1)_q$, where $X^1$ is halogen; $R^1$ is hydrocarbyl; p is an integer of 1 to 4; and q is 0 or an integer of 1 to 3 with the provisos that the sum of p and q is 4 and the first and second titanium-containing compounds are not identical.

In another aspect of the present invention a process for polymerizing propylene is disclosed. In this process propylene is polymerized under propylene polymerization conditions utilizing the catalyst of the present invention along with a first co-catalyst, an aluminum-containing compound, and a second co-catalyst, a silane compound.

DETAILED DESCRIPTION

The catalyst of the present invention is prepared by first contacting a hydrocarbon soluble magnesium compound with a modifying compound. The soluble magnesium compound is preferably a compound having the structural formula $Mg(OR)_rX_s$, where R is hydrocarbyl; X is halogen, r is 1 or 2; and s is 0 or 1 with the proviso that the sum of r and s is 2. More preferably, R is $C_1$-$C_{10}$ hydrocarbyl; X is bromine or chlorine. Still more preferably, R is $C_1$-$C_{10}$ alkyl; X is chlorine; and r and s are 1. Among the preferred magnesium compounds contemplated for use in the formation of the catalyst of the present invention are 2-methylpentyloxymagnesium chloride, pentyloxymagnesium chloride, di-2-ethylhexyloxymagne and mixtures thereof.

The modifying compound, which is contacted with the hydrocarbon soluble magnesium-containing compound in the first step of the process for forming the catalyst of the present invention, is at least one compound selected from the group consisting of silicon halides, boron halides, aluminum halides, alkyl silicon halides and mixtures thereof. Of these, silicon halides, boron halides and aluminum halides are preferred. More preferably, the modifying compound is silicon tetrachloride, boron trichloride or aluminum trichloride. Even more preferably, the modifying compound is silicon tetrachloride.

The contact between the modifying compound or compounds and the soluble magnesium compound or compounds usually occurs at a temperature in the range of between about 0° C. and about 100° C. More preferably, this contact occurs at a temperature in the range of between about 30° C. and about 90° C. Still more preferably, the contact occurs at a temperature in the range of between about 40° C. and about 80° C. Most preferably, the modifying agent and the magnesium-containing compound are contacted at a temperature in the range of between about 50° C. and about 70° C. This contact occurs over a period of between about 5 minutes and about 3 hours. More preferably, the contact occurs over a period of between about 30 minutes and about 2½ hours. Most preferably, the duration of this contact is between about 1 hour and about 2 hours.

A preferred second step in the formation of the catalyst of this invention involves contact of the product of the first step of the present invention with a modifying compound. The modifying compound of this preferred second step encompasses the same classes of compounds within the contemplation of the modifying compound of the first step. It is furthermore emphasized that the preferred and more preferred embodiments of the modifying compounds of the first step apply in this preferred second step. Indeed, in a particularly preferred embodiment, the specific modifying compound utilized in the first step is employed as the modifying compound in the preferred embodiment wherein the second step involves the contacting of the first step product with a modifying compound.

This preferred second step occurs at a temperature in the same range as that of the first step. That is, the usually, preferred, more preferred and most preferred temperature ranges for this preferred second step are identical with the temperature ranges of the first step. Again, it is particularly preferred that the same temperature employed in the contact of the first step be utilized in this preferred second step.

The duration of this preferred second step is in the range of between about 1 minute to 2 hours. Preferably, the contact time of this preferred second step is between about 10 minutes and 1 hour. More preferably, the contact time of the second step is between about 20 minutes and about 40 minutes.

It is emphasized that although this second step is preferred it is not essential. Thus, the quantity of modifying agent contacted with the product of the first step in this preferred second step may, in another preferred embodiment, be added to the quantity of modifying agent which contacts the magnesium-containing compound in the essential first step of the process of forming the catalyst of the present invention.

In a further preferred embodiment, the product of the first step or, more preferably, the product of the preferred second step, when included in the formation of the catalyst, is washed. In this preferred embodiment the product is washed with an organic solvent to remove any organics-soluble residue. Although the organic solvent can be any solvent in which the solid product of the first step or preferred second step does not dissolve, it is preferred that the solvent be an aromatic or aliphatic hydrocarbon. Of these hydrocarbons, alkanes having 5 to 15 carbon atoms are more preferred. Of these, heptane is particularly preferred.

The washed product of this operation or, less preferably, the unwashed product of the first contacting step or the second optional but preferred contacting step, is next contacted with two titanium-containing compounds. The first of these compounds has the structural formula $Ti(OR)_nX_m$, where R is hydrocarbyl; X is halogen; n is an integer of 1 to 4; and m is 0 or an integer of 1 to 3 with the proviso that the sum of n and m is 4. This first titanium compound thus encompasses tetrahydrocarbyloxy titanium, trihydrocarbyloxytitanium halides, dihydrocarbyloxytitanium dihalides and hydrocarbyloxytitanium trihalides.

More preferably, the titanium-containing compound having the structural formula $Ti(OR)_nX_m$ is characterized by R being alkyl, aryl, aralkyl or alkaryl having 1 to 12 carbon atoms; X is chlorine or bromine; n is 4 and m is 0.

Among the particularly preferred titanium compounds that can be used in the formation of the catalyst of the subject invention are tetracresyl titanate, titanium tetrabutoxide, titanium tetranonolate, tetra-2-ethylhexyl titanate, tetraisobutyl titanate, tetra-n-propyltitanate, tetraisopropyltitanate and the like. Of these compounds, tetracresyl titanate is particularly preferred.

The second titanium-containing compound that contacts the product of the first or second step, which is preferably washed, is a compound having the structural formula $TiX^1(OR^1)_q$ where $X^1$ is halogen, $R^1$ is hydrocarbyl; p is an integer of 1 to 4;; and q is 0 or an integer of 1 to 3 with the proviso that the sum of p and q is 4. This second titanium-containing compound encompasses titanium tetrahalides, hydrocarbyloxytitanium trihalides, dihydrocarbyloxytitanium dihalides and trihydrocarbyloxytitanium halides. It is emphasized, however, that the present invention excludes the case where the two titanium compounds are identical.

In a preferred embodiment the second titanium-containing compound is defined by its structural formula wherein p is 2 to 4 and q is 0, 1 or 2. More preferably, p is 3 or 4 and q is 0 or 1. Most preferably, p is 4 and q is 0.

In the most preferred embodiment wherein p is 4 and q is 0, the second titanium-containing compound, a titanium tetrahalide, is preferably titanium tetrachloride or titanium tetrabromide, with titanium tetrachloride being the preferred choice of these two desirable compounds.

The contact between the titanium-containing compounds and the product of the first or second contacting steps, hereinafter denoted as the product, can occur in any sequence. That is, the product can be contacted simultaneously with the two titanium-containing compounds or as a mixture of the two titanium-containing compounds. Alternatively, there can be contact of the product with the first titanium-containing compound followed by the contact with the second titanium-containing compound. Finally, contact can be between the product and the second titanium containing compound followed by contact with the first titanium-containing compound. Of these three sequences, all within the contemplation of the present invention, the first and second contact methods are more preferred. Of the first method of contact, simultaneous contact with the first and second compound or a mixture thereof, and the second contacting method, contact first with the first titanium-containing compound followed by contact with the second titanium-containing compound, the second method is more preferred.

In the preferred embodiment wherein one of the two titanium compounds contacts the product followed by contact with the second of the two titanium-containing compounds, the duration of the initial contact is in the range of between about 1 minute and about 30 minutes, more preferably, between about 2 minutes and about 10 minutes. Contact between the product and the initially contacted titanium-containing compound occurs at a temperature in the range of between about 0° C. and about 40° C., more preferably, between about 15° C. and about 30° C.

The product of contact between the first contacted titanium-containing compound and the product, in the preferred embodiment wherein the two titanium-containing compounds are introduced separately, is next contacted with the other titanium-containing compound. As stated above, the second contact preferably involves contact with the second titanium-containing compound. Independent of which of the two titanium-containing compounds initially contact the product, the duration of contact between the product of the first contacted titanium-containing compound and the product and the second titanium-contacting compound is in the range of between about 30 minutes and about 4 hours. More preferably, this period is in the range of between about 40 minutes and about 3 hours. Still more preferably, the duration of contact is in the range of between about 45 minutes and about 2 hours.

The temperature of contact between the product already contacted with a first titanium-containing compound and the second titanium-containing compound is between about 50° C. and about 130° C. Preferably, the temperature of contact is between about 60° C. and about 120° C. In a more preferred embodiment, the temperature of contact is between about 70° C. and about 110° C. Most preferably, the temperature during contact with the second titanium-containing compound is in the range of between about 80° C. and about 100° C.

In the preferred embodiment wherein the product of the first or preferred second step is contacted with both titanium-containing compounds simultaneously or as a mixture, the duration and temperature of contact is identical with the duration and temperature of contact of the second contacted titanium-containing compound, in the preferred embodiment wherein the two titanium-containing compounds are sequentially contacted with the product of the first or second step. Obviously, the preferred ranges of time and temperature of the second contact applies to the embodiment wherein the product of the first or second step and the two titanium-containing compounds are contacted together.

Independent of the embodiment employed to contact the two titanium-containing compounds with the product of the first or preferred second step, it is preferred that the final product, the product after completion of the contact with both titanium-containing compounds, be washed. Again, washing occurs for the same purpose and preferably employs the same agent, i.e., an organic solvent, as was used in the preferred embodiment wherein a first washing step is utilized.

Although this preferred second washing step is substantially identical to the first washing step in terms of organic agent, it is preferred that the second washing step, leading to the production of the final catalyst product, be more extensive. That is, it is preferred that more washing sequences be provided. Thus, whereas the preferred first washing step preferably includes about 2 to about 6 washing sequences this second washing step employs about 3 to about 16 washing sequences, more preferably, about 6 to about 12 washing sequences.

Another aspect of the present invention involves the use of the catalyst of the present invention in the polymerization of propylene to produce polypropylene and propylene copolymers. In this process propylene is polymerized under propylene polymerization conditions in the presence of the catalyst of the instant invention.

In the propylene polymerization of the present invention present also is a co-catalyst, an aluminum-containing compound. The aluminum compound is preferably an aluminum alkyl, an alkylaluminum halide or a mixture thereof. More preferably, the co-catalyst is an aluminum alkyl. Of the aluminum alkyls, it is preferably that they be characterized by the formula $Al(R^2)_3$, where $R^2$ is $C_1-C_4$ alkyl For example, triethylaluminum and triisobutylaluminum are particularly preferred. Obviously, these compounds are characterized by the recited structural formula where $R^2$ is $C_2-C_4$ alkyl.

A second co-catalyst is also employed in the propylene polymerization process of the present invention. The second co-catalyst of this invention is preferably at least one silane compound.

The silane compound preferably has the structural formula $SiR_n(OR^1)_{4-n}$, where R and $R^1$ are independently hydrocarbyl; and n is an integer of 1 to 3. More preferably, R is $C_1-C_8$ straight or branched alkyl; phenyl, $C_7-C_{10}$ $C_7-C_{10}$ alkaryl, $C_3-C_8$ cycloalkyl or $C_3-C_8$ cycloalkenyl; $R^1$ is independently $C_1-C_6$ alkyl; and n is an integer of 1 or 2. Still more preferably, R is independently $C_3-C_4$ branched alkyl; and $R^1$ is independently $C_1-C_3$ alkyl. Particularly preferred silane species include isobutyltrimethoxysilane, isobutylisopropyldimethoxysilane and the like.

The usual propylene polymerization conditions involve a polymerization temperature in the range of between about 35° C. and about 100° C. More preferably, the temperature of this reaction is in the range of about 50° C. and about 80° C. The pressure of the propylene polymerization reaction is in the range of between about 300 psig and about 600 psig, more preferably, between about 400 psig and about 500 psig.

The following examples are given to illustrate the scope of this invention. Because these examples are given for illustrative purposes only, the invention embodied therein should not be limited thereto.

EXAMPLE 1

Catalyst Preparation

A 250 ml., three-necked round bottomed flask equipped with a nitrogen purge, a paddle stirrer, a heptane inlet, a siphon and a thermometer was purged with nitrogen. When a completely dry, inert nitrogen atmosphere was obtained the flask was charged with heptane (20 ml). To this heptane was added 2-methylpentyloxymagnesium chloride (50.0 ml) followed by the addition of silicon tetrachloride (10 ml). This mixture was heated at 60° C. while nitrogen was continually being introduced into the contents of the flask. Heating under these conditions continued for 1.25 hours.

Upon completion of this step additional silicon tetrachloride (5.0 ml) was added to the flask under a nitrogen purge while still being heated at 60° C. The contents of the flask were heated at this temperature for 30 minutes. The flask and its contents were then allowed to cool to room temperature. The solid product resulting from this contact was allowed to settle and the supernatant liquid was siphoned off. Heptane (90 ml.) was added to the solids remaining in the flask. The solids and heptane liquid were stirred for 5 minutes. Thereafter, stirring was stopped and the solids were again allowed to settle. The supernatant liquid was again siphoned off. This washing procedure, which was conducted under nitrogen purge, was repeated three times.

After the fourth wash, the flask containing the washed solids was charge with tetracresyltitanate (3.5 ml.) and titanium tetrachloride (10.0 ml.). The resultant slurry was stirred and heated for 1 hour at 90° C. under a nitrogen purge.

The solid product of this contact was again allowed to settle and the supernatant liquid was siphoned off. The solids were washed with heptane in a washing procedure identical with the washing procedure described above. However, this second washing procedure of the solids were repeated twelve times, compared to only four times in the first washing step. It is noted that in this second washing step each heptane charge was 80 ml., rather than the 90 ml. volume heptane charge used in each wash of the first washing step. The solids were thereafter completely dried in a nitrogen atmosphere to provide the final catalyst product.

EXAMPLE 2

Catalyst Procedure

A second catalyst product was produced in identical accordance with the procedure of Example 1.

EXAMPLE 3

Polymerization of Propylene

A reactor was initially purged with nitrogen. To the purged reactor was added heptane (20 ml.), followed by the introduction of triethylaluminum (0.8 ml., introduced as a 1.5 M solution in heptane). Isobutylisopropyldimethoxysilane (0.1 ml., introduced as 1 M solution in heptane) was next charged into the reactor followed by the charging of the solid catalyst of Example 1 (10 mg.). Hydrogen gas (200 ml.) was introduced into the reactor from an 80 psig pressurized hydrogen gas cylinder. Finally, propylene (325 g.) was added to the reactor.

The reactor was heated to 70° C. thus attaining a pressure of 460 psig. The contents of the reactor were stirred by a stirrer rotating at 400 revolutions per minute. These conditions were maintained for 1 hour during which time the propylene was polymerized to polypropylene.

This polymerization reaction was repeated using identical reactants and catalysts in the same concentrations as used in the first run.

The results of these two propylene polymerization runs were reported in terms of quantity and quality. That is, quantity was determined in terms of weight of product per unit weight of catalyst. Quality was determined as percent polymer insolubility in heptane.

In the first run, 27,000 grams of polypropylene were polymerized per gram of catalyst, made in accordance with the procedure of Example 1, charged. This polypropylene was 95.1% by weight insoluble in heptane. The second run yielded 28,000 grams of polypropylene per gram of catalyst, made in accordance with the procedure of Example 1, charged. This polypropylene product was 97.1% by weight insoluble in heptane.

EXAMPLE 4

Polymerization of Propylene

The polymerization procedure of Example 3 was repeated except that the catalyst charged into the reactor in this example was made using the catalyst of Example 2 rather than Example 1.

As in Example 3, two polymerization runs, using identical 10 mg. charges of catalyst made in accordance with Example 2, were conducted. In the first run 34,000 grams of polypropylene per gram of catalyst charged was produced. This polypropylene was characterized by a heptane insolubility of 96.7% by weight. The second run produced 36,800 grams of polypropylene per gram of catalyst charged. The heptane insolubility of this polypropylene was 95.7% by weight.

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A catalyst comprising the product produced by the steps of:
    (a) contacting at least one hydrocarbon soluble magnesium compound with a modifying compound selected from the group consisting of silicon halides, boron halides, aluminum halides, alkyl silicon halides and mixtures thereof; and
    (b) contacting the product of the contact of step (a) with a first titanium-containing compound having the structural formula $Ti(OR)_nX_m$, where R is hydrocarbyl; X is halogen; n is an integer of 1 to 4; and m is 0 or an integer of 1 to 3, with the proviso that the sum of n and m is 4 and a second titanium-containing compound having the structural formula $TiX^1{}_p(OR^1)_q$, where $X^1$ is halogen; $R^1$ is hydrocarbyl; p is an integer of 1 to 4; and q is 0 or an integer of 1 to 3, with the provisos that the sum of p and q is 4 and that said first and said second titanium-containing compounds are not identical.

2. A catalyst in accordance with claim 1 wherein said product of step (a) is contacted with said first titanium-containing compound and said second titanium-containing compound simultaneously or as a mixture.

3. A catalyst in accordance with claim 1 wherein said product of step (a) is contacted with said first titanium-containing compound, the product of which is contacted with said second titanium-containing compound.

4. A catalyst in accordance with claim 1 wherein said product of step (a) is contacted with said second titanium-containing compound, the product of which is contacted with said first titanium-containing compound.

5. A catalyst in accordance with claim 1 comprising the step of contacting the product of step (a) with said modifying compound, the product of which is treated in accordance with the procedure of step (b).

6. A catalyst in accordance with claim 1 including the step of washing the product of step (a) with an organic solvent.

7. A catalyst in accordance with claim 5 where said product, subsequently treated in accordance with step (b), is washed with an organic solvent.

8. A catalyst in accordance with claim 1 including the step of washing the product of step (b) with an organic solvent.

9. A catalyst in accordance with claim 5 including the step of washing the product of step (b) with an organic solvent.

10. A catalyst comprising the product produced by the steps of:
    (a) contacting at least one hydrocarbon soluble magnesium compound having the structural formula $Mg(OR)_rX_s$, where R is hydrocarbyl; X is halogen; r is 1 or 2; and s is 0 or 1, with the proviso that the sum of r and s is 2, with a modifying compound selected form the group consisting of silicon halides, boron halides, aluminum halides and mixtures thereof; and
    (b) contacting said product of step (a) with a titanium ester having the structural formula $Ti(OR)_4$, where R is hydrocarbyl, and a titanium halide having the structural formula $TiX^1{}_4$, where $X^1$ is halogen 11. A catalyst in accordance with claim 10 wherein said soluble magnesium compound is characterized by R being $C_1$–$C_{10}$ hydrocarbyl; $X^1$ is bromine or chlorine; and r and s are 1.

12. A catalyst in accordance with claim 11 wherein said soluble magnesium compound is an alkoxymagnesium bromide or an alkoxymagnesium chloride.

13. A catalyst in accordance with claim 12 wherein said soluble magnesium compound is selected from the group consisting of 2-methylpentyloxymagnesium chloride, pentyloxymagnesium chloride and mixtures thereof.

14. A catalyst in accordance with claim 10 wherein said modifying compound is selected from the group consisting of silicon tetrachloride, boron trichloride and aluminum trichloride.

15. A catalyst in accordance with claim 10 wherein said titanium ester is selected from the group consisting of tetracresyltitanate, titanium tetrabutoxide, titanium tetranonolate and tetra-2-ethylhexyltitanate, tetraisobutyltitanate, tetra-n-propyltitanate, tetraisopropyltitanate and mixtures thereof.

16. A catalyst in accordance with claim 10 wherein said titanium halide is selected from the group consisting of titanium tetrachloride and titanium tetrabromide.

17. A catalyst in accordance with claim 10 wherein said product of step (a) is contacted with said titanium ester and said titanium halide simultaneously or as a mixture.

18. A catalyst in accordance with claim 10 wherein said product of step (a) is contacted with said titanium ester, the product of which is contacted with said titanium halide.

19. A catalyst in accordance with claim 10 wherein said product of step (a) is contacted with said titanium halide, the product of which is contacted with said titanium ester 20. A catalyst in accordance with claim 10 including the step of contacting the product of step (a) with said modifying compound of said step (a), the product of which is treated in accordance with the procedure of step (b).

21. A catalyst in accordance with claim 10 including the step of washing the product of step (a) with an alkane having 5 to 15 carbon atoms.

22. A catalyst in accordance with claim 20 wherein said product subsequently treated in accordance with step (b) is washed with an alkane having 5 to 15 carbon atoms.

23. A catalyst in accordance with claim 10 including the step of washing the product of step (b) with an alkane having 5 to 15 carbon atoms.

24. A catalyst in accordance with claim 20 including the step of washing the product of step (b) with an alkane having 5 to 15 carbon atoms.

25. A catalyst comprising the product produced by the steps of (a) contacting 2-methylpentyloxymagnesium chloride with silicon tetrachloride; and
(b) contacting the product of step (a) with tetracresyltitanate and titanium tetrachloride.

26. A catalyst in accordance with claim 25 comprising the step of contacting the product of step (a) with silicon tetrachloride and wherein the product of this contact is treated in accordance with step (b).

27. A catalyst in accordance with claim 25 including the step of washing the product of step (a) with heptane prior to said step (b).

28. A catalyst in accordance with claim 27 including the step of washing the product of step (b) with heptane.

29. A catalyst in accordance with claim 26 including the step of washing the product of the contact of step (a) and silicon tetrachloride with heptane.

30. A catalyst in accordance with claim 29 including the step of washing the product of step (b) with heptane.

31. A catalyst in accordance with claim 1 wherein said hydrocarbon soluble magnesium compound has the structural formula $Mg(OR)_rX_s$, where R is hydrocarbyl; X is halogen; r is 1 or 2; and s is 0 or 1, with the proviso that the sum of r and s is 2.

* * * * *

UNITED STATES PATENT AND TRADEMARK OFFICE
CERTIFICATE OF CORRECTION

PATENT NO. : 5,037,789
DATED : August 6, 1991
INVENTOR(S) : C. K. Buehler

It is certified that error appears in the above-identified patent and that said Letters Patent is hereby corrected as shown below:

Column 10, line 26: "form" should read -- from --.

Column 11, line 2: after "ester" insert -- . --.

Signed and Sealed this

Sixteenth Day of March, 1993

Attest:

STEPHEN G. KUNIN

Attesting Officer

Acting Commissioner of Patents and Trademarks